United States Patent [19]

Chahroudi

[11] 4,307,942
[45] Dec. 29, 1981

[54] SOLAR CONTROL SYSTEM

[75] Inventor: Day Chahroudi, Placitas, N. Mex.

[73] Assignee: The Southwall Corporation, Palo Alto, Calif.

[21] Appl. No.: 128,591

[22] Filed: Mar. 10, 1980

Related U.S. Application Data

[63] Continuation-in-part of Ser. No. 870,394, Jan. 18, 1978, abandoned, which is a continuation-in-part of Ser. No. 680,262, Apr. 26, 1976, abandoned, which is a continuation-in-part of Ser. No. 471,767, May 20, 1974, Pat. No. 3,953,110.

[51] Int. Cl.³ .................. B32B 7/00; G02F 1/19; F24J 3/02
[52] U.S. Cl. .................................... 350/353; 350/266
[58] Field of Search ........................... 350/353, 266

[56] References Cited

U.S. PATENT DOCUMENTS

| | | | |
|---|---|---|---|
| 3,953,110 | 4/1976 | Charoudi | 350/266 |
| 4,260,225 | 4/1981 | Walles | 350/353 |
| 4,261,331 | 4/1981 | Stephens | 350/353 |

Primary Examiner—William L. Sikes

[57] ABSTRACT

Apparatus for inhibiting the transmission of solar energy above a predetermined temperature range, but permitting transmission of said energy below that range, is disclosed. A layer of material is provided which undergoes a reversable, macroscopically non-mechanical change affecting the transmissivity of the material to solar energy in the desired temperature range. Because of such change, the material is at least 50% less transmissive to solar energy above the transition temperature range than below the range. This layer of material is mounted so that its physical configuration is substantially maintained.

20 Claims, 6 Drawing Figures

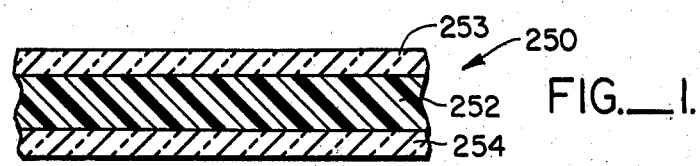
FIG._1.
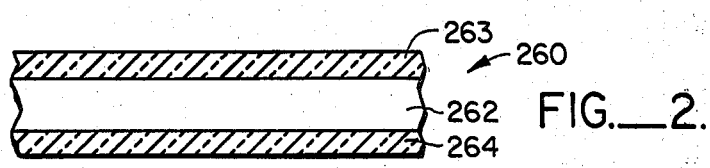
FIG._2.
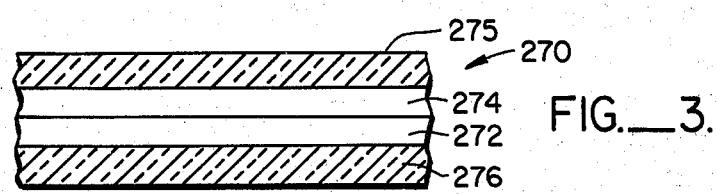
FIG._3.
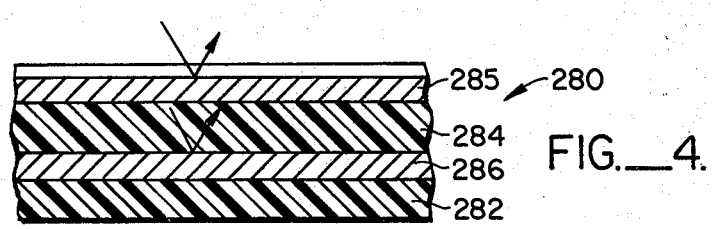
FIG._4.
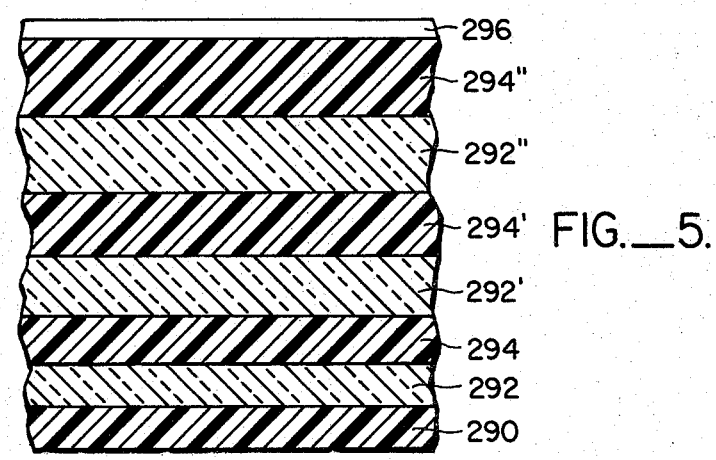
FIG._5.
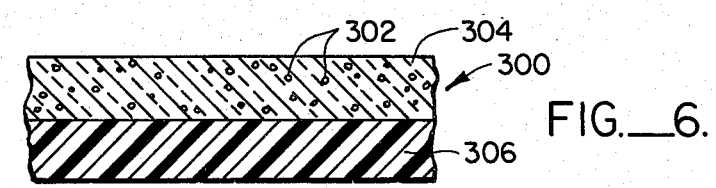
FIG._6.

SOLAR CONTROL SYSTEM

This application is a continuation in part of a previous application of the same title, Ser. No. 870,394, filed Jan. 18, 1978, now abandoned which was a continuation in part of a previous application entitled ENERGY CONTROL SYSTEM, Ser. No. 680,262, filed Apr. 26, 1976, now abandoned in which Day Chahroudi and John R. Brookes were named as joint inventors, which was in turn a continuation in part application of an application in which Day Chahroudi was the sole inventor entitled TRANSPARENT THERMAL INSULATING SYSTEM, Ser. No. 471,767; filed May 20, 1974, now issued as U.S. Pat. No. 3,953,110 on Apr. 27, 1976.

BACKGROUND OF THE INVENTION

The present invention relates to apparatus for inhibiting the transmission of solar energy above a predetermined temperature range but permitting transmission of said energy transmission of said energy below the range.

To utilize solar energy for heating and other purposes, it is usually desirable that the solar energy be collected within a spatial volume, such as within a dwelling, solar collector or a greenhouse, and that the influx of solar energy be maximized. However, particularly with respect to dwellings, excessive influx of solar energy which would raise the temperature within the dwelling to a non-acceptable level is undesirable. Accordingly, when the temperature inside the dwelling or other type of collector reaches a certain level, it is advantageous to stop the influx of solar energy, but to maximize the influx of solar energy until that temperature level is reached.

At the present time, control over the influx of solar energy is achieved in a mechanical fashion by interposing a non-transmissive layer. This non-transmissive layer can consist simply of drapes, shades, venetian blinds, and the like, and where the utilization of solar energy is to be maximized, the operation of such devices is often mechanized, as illustrated in the patent to Telkes, U.S. Pat. No. 2,595,905. However, such mechanical devices are generally cumbersome, expensive and often unsightly, and the necessity of their use represents a severe impediment to the efficient utilization of solar energy, particularly for home heating.

SUMMARY OF THE INVENTION

The present invention provides apparatus for inhibiting the transmission of solar energy above a predetermined temperature range, but permitting transmission of said energy below that range. A layer of material is provided which undergoes a reversable, macroscopically non-mechanical change affecting the transmissivity of the material to solar energy in the desired temperature range. Because of such change, the material is at least 50% less transmissive to solar energy above the temperature than below the range. This layer of material is mounted so that its physical configuration is substantially maintained.

In the present invention, the apparatus can be added to a simple window member. Below the predetermined temperature range, such a window member is fully transmissive to solar energy, and for all practical purposes invisible. When used in a dwelling, this system does not inhibit utilization of a window as a standard window member when solar energy influx is desirable. However, when the ambient temperature rises above the preselected temperature range, the system turns opaque, and efficiently inhibits further influx of solar energy.

A change in the transmissivity of the material may be accomplished in different wasy, as discussed in detail with reference to the preferred embodiments disclosed herein. Some changes occur on a molecular or atomic level, and do not involve a change in size or shape of the substance. Others involve slight variations in the shape of the material in which the actual thickness of the material changes a fraction of an optical wavelength. However, on a macroscopic scale, such changes can be considered to be non-mechanical, in direct contrast to mechanical devices such as shades, blinds and the like now known in the art.

The only attempt known to applicant to construct a non-mechanical solar shutter was made in Germany in the late 1950's or early 1960's. Panels were provided in the Munich Zoo in which 5% polyvinylmethylether (pvme) was used in agar/agar, a biological nutrient, as a binder. This material was located between glass panes which were approximately ½ inch apart. This attempt at a solar shutter was essentially a failure, and achieved far less than the 50% transmission reduction achieved by the preferred embodiments described hereinafter.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a fragmentary, sectional view of a first embodiment of the present invention utilizing a material which turns opaque above a certain temperature;

FIG. 2 is a fragmentary, sectional view of a second embodiment of the present invention in which an impregnated polymer is used;

FIG. 3 is a fragmentary, sectional view of a third embodiment of the present invention in which a water-sensitive layer and a water release layer are used;

FIG. 4 is a fragmentary, sectional view of a fourth embodiment of the present invention in which a layer having variable optical thickness is sandwiched between adjacent layers;

FIG. 5 is a fragmentary, sectional view of a fifth embodiment of the present invention in which a plurality of alternating temperature sensitive and other layers are used;

FIG. 6 is a fragmentary, sectional view of a sixth embodiment of the present invention in which a ceramic with embedded metal particles is used.

DESCRIPTION OF THE PREFERRED EMBODIMENTS

Various types of thermostatic solar shutters are illustrated by way of reference to FIGS. 1-6. The thermostatic solar shutter is a passive mechanism whose properties change when the ambient temperature reaches a certain level so as to become specularly or diffusely reflective to solar radiation. Below the selected temperature they are substantially transparent to such radiation. Each FIG. 1-6 is a greatly enlarged, fragmentary cross sectional view of the appropriate material.

A first solar shutter 250 is illustrated by way of reference to FIG. 1. A substance 252 which becomes opaque above a certain temperature is sandwiched between two layers of glass or plastic 253, 254.

Substance 252 is of the type which contains a clear solution or gel below a certain temperature range, but above that temperature range forms a precipitate of small particles whose index of refraction of solar radiation differs from that of the remaining solution so that the substance becomes opaque to visual radiation. It has been found that such substances should have a precipitating medium which obeys the formula:

$G = \Delta H - T\Delta S$
$G$ = Gibb's free energy of solution
$H$ = enthalpy of solution
$T$ = temperature, and
$S$ = entropy of solution.

It is evident that the entropy of solution must be negative so that the Gibb's free energy of solution is positive so that the material forms a precipitate as the temperature rises.

It has been found that aqueous solutions of polyvinylmethylether (PVME) have the necessary properties of substance 252. In addition, other aqueous solutions such as polyvinyl alcohol-polyvinylacetate copolymer, certain methacrylic copolymers and many nonpolymeric surfactants exhibit the same characteristics. Non-aqueous examples include hexafluropropylenevinyldine fluoride copolymer in a dibutyl acetate solvent, and polystyrene in cyclohexane.

Substance 252 can include various solvents, including water, lithium trifluoroacetate, and lithium fluoride-lithium chloride eutectic. The latter two are advantageous because thin plastic films are impermeable to them.

The primary problem with solar shutter 252 is that the solvent, usually water, is subject to loss by transmission through layers 253, 254 if they are plastic, which is somewhat permeable to water vapor. It has been found that Aclar, an Allied product, and Saran, a Dow product, are highly impermeable to water. However, it has been found most advantageous to carry the precipitating material in a gel or matrix such as a cross linked hydroxyethyl methacrylate-hydroxyethyl acrylate copolymer or to cross link the precipitating material to maintain separation of the precipitated particles or solvent in the opaque state to prevent them from coagulating. Other nonpolymeric substances which have polymer-like characteristics, such as long chain alcohols, can also be used.

In addition to substances with a negative entropy of solution, other substances are known which have non-congruent melting points. Upon melting, these materials separate into a solid and liquid phase. Thus a non-congruent melting material will be homogeneous at a low temperature, but be inhomogeneous and scattering of light above its melting point. This incongruent melting point material may be embedded in a matrix for mechanical support. Examples of such incongruent substance are sodium and potassium carbonate hydrates, and lithium bromide-ethanol complex. Advantages of these materials in the context of the present invention include sharp transition temperature and high optical scattering above that temperature. In addition, loss of solvent or volatile phase is a particular problem with these types of optical switches. The above incongruent melting substances tend to bind the volatile phase and prevent evaporative loss. Particularly advantageous substances are those whose constituents have a low vapor pressure and low permeability through the cover films.

A second solar shutter 260 is illustrated by way of reference to FIG. 2. A rubber-like polymer 262 is sandwiched between glass or plastic layers 263, 264.

Rubber 262 is physically transparent, and is impregnated with a volatile liquid such as freon. The liquid has a boiling point at a preselected transition temperature so that the liquid forms bubbles in the polymer above that temperature. When the bubbles are formed, the polymer becomes opaque. It has been found that halocarbon compounds in silicon rubber, preferably with a nucleating agent such as silica particles, provide an acceptable substance 262.

Alternately, layer 262 can consist of a rigid or semi-rigid porous medium such as silica gel whose refractive index matches that of the volatile liquid.

A third solar shutter 270 is illustrated by way of reference to FIG. 3. A water sensitive layer 272 and a water release agent 274 are sandwiched between glass or plastic layers 275, 276. Water sensitive layer 272 can comprise a copolymer or polymer mixture such as methyl methacrylate-methacrylic acid copolymer, or a mixture of polyvinyl alcohol and Viton. Water release agent 274 can comprise a hydrated salt or other substance which releases water above a preselected temperature. Where the ambient temperature reaches a certain level, water release agent 274 releases water to actuate water sensitive layer 272 to render shutter 270 opaque to solar radiation.

A fourth solar shutter 280 is illustrated by way of reference to FIG. 4. A plastic substrate 282 which is visibly transparent is used. A material 284 with variable optical properties is superposed over substrate 282. Deposited metal layers 285, 286 are located on opposite sides of substance 284.

Substance 284 is a type of material that changes its optical path length to solar radiation at or around a preselected temperature. The optical path length change can result from either a physical change, such as a physical thickness, density, or an electronic change such as in its ferro electric properties. For example, barium titanium trioxide and vanadium dioxide undergo a transition at a given temperature which changes their optical thickness. A further example is the change in density of a plastic which melts into a rubber. The physical thickness of substance 284 is preferably $\frac{1}{4}$ or $n/2 + \frac{1}{4}$ wavelength thick in the clear state and $\frac{1}{2}$ or $n/2 + \frac{1}{2}$ wavelength in the opaque state, where "n" is an integer. It is preferred for "n" to be as low as possible to improve the angle of acceptance of the solar shutter.

Metal layers 285, 286 have a physical thickness of between 50 and 500 angstroms. The metal layers together with substance 284 are virtually transparent to visible radiation when approximately one-quarter optical wavelength apart. However, if the optical separation of layers 285, 286 changes due to a change in the optical properties of substance 284, they become virtually opaque to visual radiation, and less than 30% of all solar radiation is transmitted.

Alternately, a single metal layer can be used to make a solar shutter that operates in a manner similar to the one above. In this case, the metal film has on both sides a material whose optical path length changes to change the transmission of solar energy of the combined three layers. This material is basically the invention of the embodiment illustrated in FIG. 4.

As a further alternative to the embodiment illustrated in FIG. 4, multiple pairs of dielectric/optical path length change materials can be used, as illustrated by a fifth embodiment of the present invention in FIG. 5. A glass or plastic substrate 290 is employed. A series of layer pairs including dielectric layers 292, 292', 292" alternate with optically variable layers 294, 294', 294" on substrate 290. An anti-reflection layer 296 may be provided on the exposed layer 294".

It is seen that when the shutter is below the transition temperature range of the optical path length change material, light is readily transmitted through the stack because the different layers have the same real index of refraction. However, when the shutter is above its transition temperature range the indices no longer match and light is reflected from each interface between the change material 294, 294', 294" and the other layers 292, 292' and 292".

The reflectivity in the reflective state is maximized in two ways first the change material is chosen to have as large as possible a change in its real index. Second, the stack is arranged in pairs and each pair is tuned to have a maximum reflection at a particular wavelength. This is done by having the thickness of each of the layers in a pair equal to ¼ of that particular wavelength in the material when it is above its transition temperature range. In order to reflect the entire spectrum in question, each pair has a maximum reflection in a different portion of the spectrum. Thus, it can be seen that the broader the spectrum that must be reflected, the greater the number of pairs of layers required. Also, the lower the change in index of the change material and the greater the reflectivity required, the more pairs of layers are necessary.

An advantage of dielectric layers 292, 292', 292" over the metal layers in optical shutter 280 (FIG. 4) is that since dielectrics do not absorb solar energy whereas metals do, the shutter will absorb less solar energy. This low absorption prevents the shutter from locking into the reflective state due to heating from absorbed light and losing its sensitivity to ambient temperature. The optical path length change material 294, 294', 294" may also be a dielectric which is chosen to have a low absorption of visible light, preferably zero, in either of its states and to have a large and abrupt increase or decrease in its real index of refraction when heated above its change temperature. This change must be reversible with little hysteresis. In other words, its real index of refraction is approximately a simple step function of temperature. Dielectric layers 292, 292', 292" are made from a material whose absorption of visible light is low, preferably zero, and whose real index of refraction exactly matches that of the change dielectric when it is in its low temperature phase over the spectrum to be transmitted.

An example of a phase change dielectric which has the required large step function of real index versus temperature without significant hysteresis in thin films is vanadium dioxide, $VO_2$. Its transition temperature is 70 C., but can be brought down to 30 C. by doping with tungsten dioxide. The real index of this material changes reversibly on being heated. Unfortunately, its absorption is a bit high. Zicronium momochloride, ZrCl, Vanadium sulfide, VS, titanium pentoxide, $Ti_3O_5$, and nickel sulfide NiS, are other such phase change materials that have room temperature transitions and thus can be utilized to make thermally activated thin film optical shutters for architectural applications.

A sixth embodiment 300 of the present invention (FIG. 6) utilizes conductive metal particles 302 dispersed in a ceramic 304 that undergoes a conductivity transition from insulating to conductive upon heating. Ceramic 304 is coated on substrate 306. When the ceramic is insulating state, the electrons are localized in the metal particles and the stack is therefore nonreflecting to solar energy. When the ceramic is in the conducting state, the electrons tunnel from one metal particle to another and the stack is therefore reflective to solar energy.

In each of the above embodiments, the material undergoes a change in a limited temperature range by which it is transformed from a material which is generally transparent to solar radiation to one which blocks a substantial portion of said radiation. In each instance, the transition is such so that at least 50% less solar energy is transmitted above the preselected temperature range than below. In all cases, the change in the material is, at least on a macroscopic scale, non-mechanical.

While several preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. Apparatus for inhibiting the transmission of solar energy above a predetermined temperature range, but permitting transmission of said energy below that range, said apparatus comprising:
   a layer of a porous polymeric material, a solvent impregnating said porous material, and a temperature-sensitive substance impregnating said porous material and having a negative entropy of solution in said temperature range, causing said layer to undergo a reversible, macroscopically non-mechanical change affecting the transmissivity of said material to solar energy in said temperature range so that said layer is at least 50% less transmissive to said solar energy above said temperature range than below said temperature range; and
   means for mounting said layer of material so that the configuration of said layer is substantially maintained.

2. Apparatus as recited in claim 1 wherein said mounting means comprises a pair of sheet elements located on opposite sides of said layer of material to confine said layer of material therebetween.

3. Apparatus as recited in claim 1 wherein said porous polymeric material is resistant to depolymerization.

4. Apparatus for inhibiting the transmission of solar energy above a predetermined temperature range, but permitting substantially unrestricted transmission of said energy below that range, said apparatus comprising:
   a layer of porous polymeric material resistant to depolymerization in the presence of solar ultraviolet radiation;
   a solvent impregnating said porous material; and
   a temperature-sensitive substance impregnating said porous material and having a negative entropy of solution in said temperature range.

5. Apparatus as recited in claim 4 wherein the substance comprises a copolymer the proportions of whose constituent monomers are adjusted such that the copolymer in the neighborhood of its transition temperature has a negative enthalpy and entropy of solution such that the Gibb's free energy of solution becomes zero at the transition temperature range, causing precipitation of the copolymer.

6. Apparatus as recited in claim 4 and additionally comprising a pair of layers sandwiching the porous material therebetween, and wherein said solvent comprises a polar solvent having low permeability through said sandwiching layers.

7. Apparatus as recited in claim 4 and additionally comprising a pair of layers sandwiching the porous material therebetween, and wherein said solvent comprises a complex solvent consisting of components having mutual affinity to minimize the loss of said solvent through the sandwiching layers.

8. Apparatus as recited in claim 4 wherein said porous material comprises hydroxyethylmethacrylate polymer.

9. Apparatus as recited in claim 4 wherein said temperature-sensitive substance comprises long chain alcohol.

10. Apparatus as recited in claim 4 wherein said temperature-sensitive substance comprises an organic compound.

11. Apparatus for inhibiting the transmission of solar energy above a predetermined temperature range and permitting transmission of said energy below said temperature range, said apparatus comprising:
a layer of a substance having an optical thickness of approximately $n/2 + \frac{1}{4}$ visible wavelength below said temperature range and a different optical thickness above said temperature range, n being zero or an integer; and
a pair of thin film metallic reflective layers on opposite sides of said substance sandwiching said substance therebetween so that solar radiation is transmitted through said layers below said temperature range and reflected above said temperature range.

12. Apparatus as recited in claim 11 wherein said substance has an optical thickness of approximately $n/2 + \frac{1}{2}$ visible wavelength above said temperature range.

13. Apparatus as recited in claim 11 wherein said layer of substance and said reflective layers include a plurality of layer pairs, each layer pair including a layer of said substance and a thin film metallic reflective layer.

14. Apparatus for inhibiting the transmission of solar energy above a predetermined temperature range and permitting transmission of said energy below said temperature range, said apparatus comprising a plurality of parallel layer sets, each said layer set including:
a layer of substance having an optical thickness of approximately $n/2 + \frac{1}{4}$ visible wavelength, n being zero or an integer; and
a nonmetallic layer having an optical thickness of $n/2 + \frac{1}{4}$ visible wavelength located parallel to said substance layer and having a real index of refraction substantially equal to that of said substance layer below said temperature range and a different real index of refraction above said temperature range so that solar radiation is transmitted through said substance below said temperature range and reflected above said temperature range;
each said layer set being tuned to have a maximum reflection above said temperature range at a particular wavelength so that the layer sets in combination give high reflectance across a wavelength band.

15. Apparatus for inhibiting the transmission of solar energy above a predetermined temperature range but permitting transmission of such energy below said temperature range, said apparatus comprising an admixture of electron-rich metal particles and a semiconductor material which undergoes a conductivity transition in said temperature range so that said admixture is reflective to solar radiation above said temperature range.

16. Apparatus as recited in claim 15 wherein said semiconductor comprises a ferro electric material.

17. Apparatus for inhibiting the transmission of solar energy above a predetermined temperature range, but permitting transmission of said energy below that range, said apparatus comprising:
at least two parallel layers of material, at least one of which undergoes a reversible, macroscopically non-mechanical change effecting its refractive index in said temperature range causing optical interference above said temperature range between the layers in the transmission of solar energy through said layers in combination resulting in the combined layers being at least 50% less transmissive to said solar energy above said temperature range than below said temperature range; and
means for mounting said layers of material so that the configuration of said layers is substantially maintained.

18. Apparatus as recited in claim 17 wherein said layers include a layer of a substance having an optical thickness of approximately $n/2 + \frac{1}{4}$ visible wavelength below said temperature range and a different optical thickness above said temperature range, n being zero or an integer, and a pair of thin film metallic reflective layers on opposite sides of said substance sandwiching said substance therebetween so that solar radiation is transmitted through said layers below said temperature range and reflected above said temperature range.

19. Apparatus as recited in claim 18 wherein said layers include a plurality of layer pairs, each layer pair including a layer of said substance and a thin film metallic reflective layer.

20. Apparatus as recited in claim 19 wherein said layers comprise a plurality of parallel layer sets, each layer set including a layer of substance having an optical thickness of approximately $n/2 + \frac{1}{4}$ visible wave length below said temperature range and a different optical thickness above said temperature range, n being zero or an integer, and a nonmetallic layer having an optical thickness of $n/2 + \frac{1}{4}$ visible wave length located parallel to said substance layer and having a real index of refraction substantially equal to said substance layer below said temperature range and a different real index of refraction above said temperature range, each said layer set being tuned to have a maximum reflection above said temperature range at a particular wave length so that the layer sets in combination give high reflectance across a wide wave length band.

* * * * *